United States Patent
Jang et al.

(10) Patent No.: US 7,539,527 B2
(45) Date of Patent: May 26, 2009

(54) APPARATUS AND METHOD FOR MATCHING ANTENNA OF MOBILE COMMUNICATION TERMINAL

(75) Inventors: Sung-Kwon Jang, Seoul (KR); Jin-Sik Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 486 days.

(21) Appl. No.: 11/318,182

(22) Filed: Dec. 23, 2005

(65) Prior Publication Data

US 2006/0142075 A1    Jun. 29, 2006

(30) Foreign Application Priority Data

Dec. 27, 2004    (KR)    ........................ 10-2004-0113269

(51) Int. Cl.
*H04M 1/00*    (2006.01)

(52) U.S. Cl. .............. 455/575.3; 455/575.4; 455/276.1; 455/272

(58) Field of Classification Search ... 455/575.3–575.7, 455/272, 276.1, 277.1
See application file for complete search history.

(56) References Cited

U.S. PATENT DOCUMENTS

| 5,335,368 | A | * | 8/1994 | Tamura | 455/575.7 |
| 6,137,403 | A | * | 10/2000 | Desrochers et al. | 340/540 |
| 6,862,432 | B1 | * | 3/2005 | Kim | 455/80 |
| 2004/0242289 | A1 | * | 12/2004 | Jellicoe et al. | 455/575.1 |
| 2007/0082709 | A1 | * | 4/2007 | Okagaki | 455/566 |

FOREIGN PATENT DOCUMENTS

| JP | 2001345882 | 12/2001 |
| KR | 1020020041216 | 6/2002 |

* cited by examiner

*Primary Examiner*—Lana N Le
(74) *Attorney, Agent, or Firm*—Lee, Hong, Degerman, Kang & Waimey

(57) ABSTRACT

An apparatus for matching an antenna of a mobile communication terminal and its method are disclosed. The apparatus for matching an antenna of a mobile communication terminal includes a sensing unit for generating a first match signal when an antenna of the mobile communication terminal and a display unit becomes adjacent to each other, and generating a second match signal when the display unit becomes apart from the antenna; a first matching unit for matching first impedance between the antenna and an RF signal generating unit based on the first match signal; and a second matching unit for matching second impedance between the antenna and the RF signal generating unit based on the second match signal.

12 Claims, 5 Drawing Sheets

APPARATUS AND METHOD FOR MATCHING ANTENNA OF MOBILE COMMUNICATION TERMINAL

This application claims the benefit of the Korean Patent Application Nos. 10-2004-0113269, filed on Dec. 27, 2004, which is hereby incorporated by reference herein in their entirety.

BACKGROUND OF THE INVENTION

1. Field of the Invention

The present invention relates to a mobile communication terminal and, more particularly, to an apparatus and method for matching an antenna of a mobile communication terminal.

2. Description of the Related Art

In general, a mobile communication system is an equipment allowing a user to perform communications with another party any time and anywhere through a mobile communication terminal while traveling in a service area, and at this time, the mobile communication terminal can maintain a communication state while moving by being wirelessly connected with a mobile base station of the corresponding service area.

The mobile communication system is wirelessly connected with the mobile communication terminal through the base station and checks a movement direction of the mobile communication terminal in real time. Herein, the base station checks a distance between the base station itself and the mobile communication terminal and uniformly maintains communication sensitivity with the mobile communication terminal. In this case, in order to uniformly maintain the communication sensitivity, the mobile communication terminal must uniformly maintain a power level of a radio frequency signal outputted from an antenna of the mobile communication terminal.

FIG. 1 is a view showing a folder type mobile communication terminal in accordance with a related art and FIG. 2 is a view showing a slide type mobile communication terminal in accordance with the related art.

As shown in FIGS. 1 and 2, as for the related art folder type or slide type mobile communication terminal, when a user opens the folder 2 or the slide 3 to use the mobile communication terminal, an LCD (Liquid Crystal Display) (not shown) of the mobile communication terminal becomes adjacent to the antenna 1 of the mobile communication terminal. Herein, the LCD is installed at the folder 2 or the slider 3.

However, the related art mobile communication terminal has a problem that when the antenna 1 and the LCD are adjacent to each other, there occurs a loss of power of the RF signal radiated from the antenna 1 by the LCD, degrading the communication sensitivity and a speech quality of the mobile communication terminal.

For example, in order to use the slide type or folder type mobile communication terminal, a user opens the folder 2 or the slider 3. At this time, the LCD nears the antenna 1 and a power loss is made due to mismatching between the antenna 1 and the LCD. Then, output power of the RF signal radiated from the antenna 1 of the mobile communication terminal is unstably radiated, and thus, the communication sensitivity and the speech quality of the mobile communication terminal deteriorate.

BRIEF DESCRIPTION OF THE INVENTION

Therefore, an object of the present invention is to provide an apparatus for matching an antenna of a mobile communication terminal capable of enhancing communication sensitivity and a speech quality of the mobile communication terminal, and its method.

To achieve these and other advantages and in accordance with the purpose of the present invention, as embodied and broadly described herein, there is provided an apparatus for matching an antenna of a mobile communication terminal comprising: a sensing unit for generating a first match signal when an antenna of the mobile communication terminal and a display unit becomes adjacent to each other, and generating a second match signal when the display unit becomes apart from the antenna; a first matching unit for matching first impedance between the antenna and an RF signal generating unit based on the first match signal; and a second matching unit for matching second impedance between the antenna and the RF signal generating unit based on the second match signal.

To achieve the above object, there is also provided a method for matching an antenna of a mobile communication terminal comprising: matching first impedance between an antenna and an RF signal generating unit of the mobile communication terminal when the antenna and a display unit become adjacent; and matching second impedance between the antenna and the RF signal generating unit when the antenna and the display unit become apart.

To achieve the above object, there is also provided an apparatus for matching an antenna of a mobile communication terminal comprising: an antenna; a switch connected with the antenna and receiving a first or second control signal; a first matching unit connected between the switch and an RF signal generating unit of the mobile communication terminal and matching impedance between the antenna and the RF signal generating unit when the antenna and the display unit of the mobile communication terminal become adjacent; a second matching unit connected between the switch and the RF signal generating unit and matching impedance between the antenna and the RF signal generating unit when the antenna and the display unit become apart; a sensing unit for generating a first match signal when the antenna and the display unit become adjacent and generating a second match signal when the antenna and the display unit become apart; and a controller for generating a first control signal for connecting the first matching unit and the antenna based on the first match signal or generating a second control signal for connecting the second matching unit and the antenna based on the second match signal.

To achieve the above object, there is also provided an apparatus for matching an antenna of a mobile communication terminal comprising: an antenna installed at a mobile communication terminal; an RF switch electrically connected with an RF signal generating unit of the mobile communication terminal and receiving first or second control signal; a first matching unit connected between the RF switch and the antenna and matching impedance between the antenna and the RF signal generating unit when the antenna and the display unit of the mobile communication terminal become adjacent; a second matching unit connected between the RF switch and the antenna, and matching impedance between the antenna and the RF signal generator when the antenna and the display unit become apart; a sensing unit for generating a first match signal when the antenna and the display unit become adjacent, and generating a second match signal when the antenna and the display unit become apart; and a controller for generating a first control signal for connecting the first matching unit and the RF signal generating unit based on the first match signal, or generating a second control signal for connecting the second matching unit and the RF signal generating unit based on the second match signal.

To achieve the above object, there is also provided an apparatus for matching an antenna of a mobile communication terminal comprising: an antenna; a first switch connected with the antenna and receiving a first or second control signal; a first matching unit connected with the first switch and matching impedance between the antenna and an RF signal generating unit of the mobile communication terminal when the antenna and the display unit of the mobile communication terminal become adjacent; a second matching unit connected with the first switch and matching impedance between the antenna and the RF signal generating unit when the antenna and the display unit become apart; a second switch connected between the first matching unit and the RF signal generating unit, connected between the second matching unit and the RF signal generating unit, and receiving a third or fourth control signal; a sensing unit for generating a first match signal when the antenna and the display unit become adjacent and generating a second match signal when the antenna and the display unit become apart; and a controller for generating a first control signal for connecting the antenna and the first matching unit and a third control signal for connecting the first matching unit and the RF signal generating unit based on the first match signal, or generating a second control signal for connecting the antenna and the second matching unit and a fourth control signal for connecting the second matching unit and the RF signal generating unit based on the second match signal.

To achieve the above object, there is also provided an apparatus for matching an antenna of a mobile communication terminal comprising: an antenna; a first matching unit connected with the antenna, an matching impedance between the antenna and an RF signal generating unit of the mobile communication terminal when the antenna and a display unit of the mobile communication terminal become adjacent; a second matching unit connected in series between the first matching unit and the RF signal generating unit, and matching impedance between the antenna and the RF signal generating unit when the antenna and the display unit become adjacent; a switch connected in parallel with the first matching unit and receiving a first or second control signal; a sensing unit for generating a first match signal when the antenna and the display unit become adjacent, and generating a second match signal when the antenna and the display unit become apart; and a controller for generating a first control signal for outputting an RF signal outputted from the RF signal generating unit to the antenna through the first and second matching units based on the first match signal, or generating a second control signal for outputting the RF signal outputted from the RF signal generating unit to the antenna through the second matching unit based on the second match signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

An apparatus and method for matching an antenna of a mobile communication terminal capable of enhancing communication sensitivity and a speech quality of a mobile communication terminal by stably controlling an RF signal radiated from the antenna of the mobile communication terminal in accordance with preferred embodiments of the present invention will now be described with reference to FIGS. 3 to 10.

Figure 1:
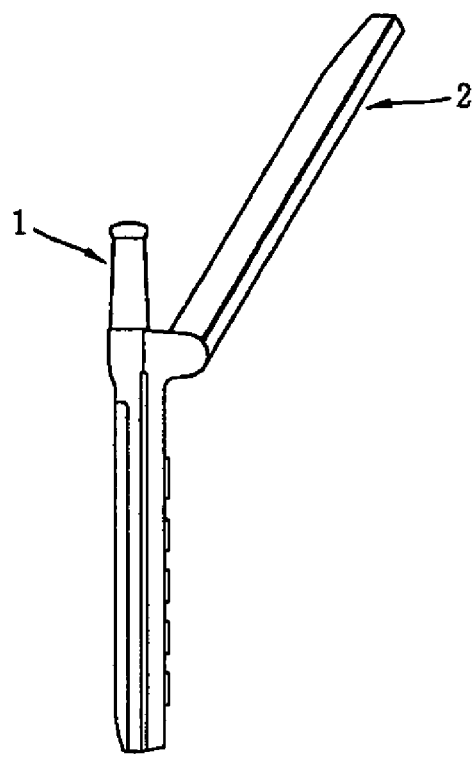
FIG. 1 shows a folder type mobile communication terminal in accordance with a related art.
Figure 2:
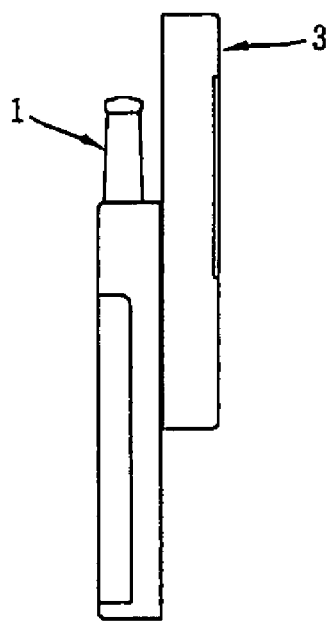
FIG. 2 shows a slide type mobile communication terminal in accordance with the related art.
Figure 3:
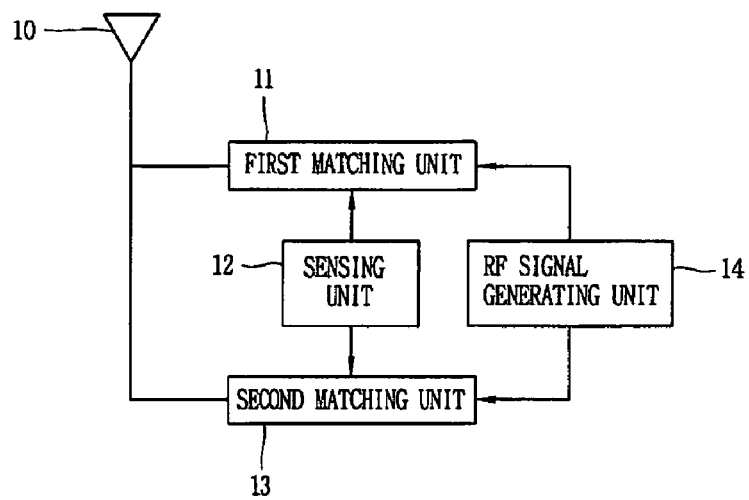
FIG. 3 is a schematic block diagram showing an apparatus for matching an antenna of a mobile communication terminal in accordance with a first embodiment of the present invention.

FIG. 3 is a schematic block diagram showing an apparatus for matching an antenna of a mobile communication terminal in accordance with a first embodiment of the present invention.

As shown in FIG. 3, an apparatus for matching an antenna of a mobile communication terminal in accordance with a first embodiment of the present invention includes: a sensing unit 12 for generating a first match signal when an antenna 10 and a display unit (not shown) of a mobile communication terminal become adjacent, and generating a second match signal when the display unit becomes apart from the antenna 10; a first matching unit 11 for matching impedance between the antenna 10 and an RF signal generating unit 14 based on the first match signal; and a second matching unit 13 for matching impedance between the antenna 10 and the RF signal generating unit 14 based on the second match signal.

When the mobile communication terminal is a folder type mobile communication terminal, the sensing unit 12 senses opening or closing of the mobile communication terminal, and when the mobile communication terminal is a slide type mobile communication terminal, the sensing unit 12 senses sliding up or sliding down of a slide of the mobile communication terminal.

The first and second matching units 11 and 13 are electrically connected between the antenna 10 and the RF signal generating unit 14, respectively. That is, since impedance between the antenna 10 and the RF signal generating unit 14 when the antenna 10 and the LCD become apart is greater than impedance between the antenna 10 and the RF signal generating unit 14 when the antenna 10 and the LCD become adjacent, the first and second matching units 11 and 13 are required to match the mutually different impedance.

The operation of the apparatus for matching the antenna of the mobile communication terminal in accordance with the first embodiment of the present invention will now be described with reference to FIG. 4.

Figure 4:
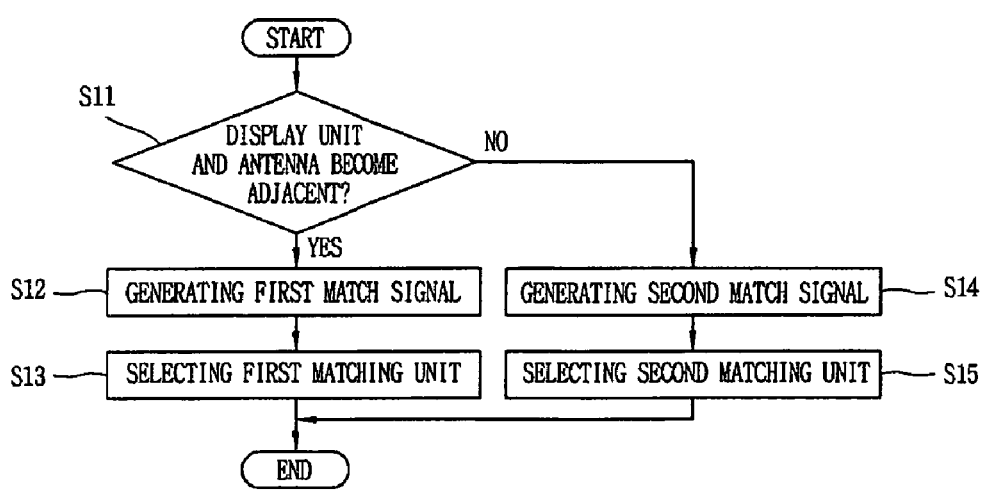
FIG. 4 is a flow chart illustrating the processes of a method for matching the antenna of the mobile communication terminal in accordance with the first embodiment of the present invention.

FIG. 4 is a flow chart illustrating the processes of a method for matching the antenna of the mobile communication terminal in accordance with the first embodiment of the present invention.

First, when the antenna 10 and the display unit (not shown) become adjacent (step S11), the sensing unit 12 generates a first match signal and outputs it to the first matching unit 11. For example, when the mobile communication terminal is a folder type mobile communication terminal and the antenna 10 installed at a main body of the mobile communication terminal and an LCD installed at a folder of the mobile communication terminal become adjacent, the sensing unit 12 generates the first match signal and outputs it to the first matching unit 11.

When the display unit becomes apart from the antenna 10, the sensing unit 12 generates a second match signal (step S14) and outputs it to the second matching unit 13. For example, when the mobile communication terminal is a folder type mobile communication terminal and the antenna 10 installed at a main body of the mobile communication terminal and an LCD installed at a folder of the mobile communication terminal become apart, the sensing unit 12 generates a second match signal and outputs it to the second matching unit 11.

The first matching unit 11 is selected by the sensing unit 12, positioned between the antenna 10 and the RF signal generating unit 14, and matches impedance (first impedance) between the RF signal generating unit 14 and the antenna 10 when the antenna 10 and the LCD become adjacent based on the first match signal.

The second matching unit 13 is selected by the sensing unit 12 (step S15), positioned between the antenna 10 and the RF signal generating unit 14, and matches impedance (second impedance) between the RF signal generating unit 50 and the antenna 10 when the antenna 10 and the LCD become apart based on the second match signal.

Namely, the first or second matching unit 11 or 13 compensates a difference value between the first impedance between the antenna 10 and the RF signal generating unit 14 when the antenna 10 and the display unit become adjacent and the second impedance between the antenna 10 and the RF signal generating unit 14 when the antenna 10 and the display unit become apart. Herein, as the first and second matching units 11 and 13, a Pi ($\pi$)-type matching circuit can be used.

Accordingly, by matching the first and second impedance, respectively, the communication sensitivity and the speech quality of the mobile communication terminal can be enhanced.

The apparatus for matching the antenna of the mobile communication terminal in accordance with the first embodiment of the present invention can be constructed variably. Different embodiments of the apparatus for matching the antenna of the mobile communication terminal will now be described with reference to FIGS. 5 to 8.

Figure 5:
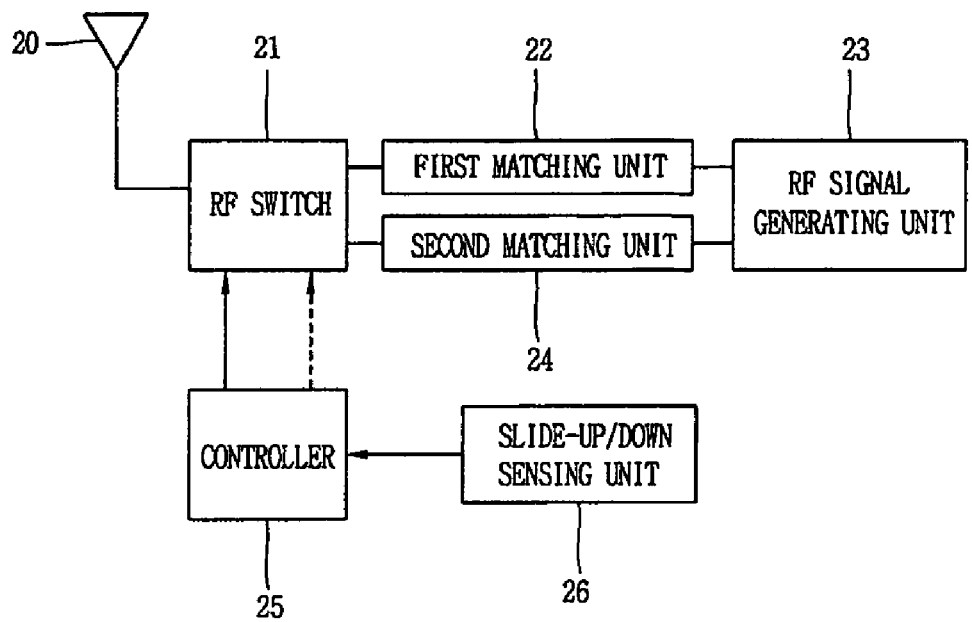
FIG. 5 is a schematic block diagram showing an apparatus for matching an antenna of a slide type mobile communication terminal in accordance with a second embodiment of the present invention.

FIG. 5 is a schematic block diagram showing an apparatus for matching an antenna of a slide type mobile communication terminal in accordance with a second embodiment of the present invention.

As shown in FIG. 5, the apparatus for matching an antenna of a mobile communication terminal in accordance with a second embodiment of the present invention includes: an antenna 20; an RF switch 21 electrically connected with the antenna 20 and receiving a first or second control signal; a first matching unit 22 connected between the RF switch 21 and an RF signal generating unit 23 and matching impedance between the antenna 20 and the RF signal generating unit 23 when a slider of the mobile communication terminal is opened; a second matching unit 24 connected between the RF switch 21 and the RF signal generating unit 23 and matching impedance between the antenna 20 and the RF signal generating unit 23 when the slider is closed; a slide-up/down sensing unit 26 for generating a first match signal when the slider of the mobile communication terminal is slid up (opened), and generating a second match signal when the slider is slid down (closed); and a controller 25 for generating a first control signal for connecting the first matching unit 22 and the antenna 20 based on the first match signal, or generating a second control signal for connecting the second matching unit 24 and the antenna 20 based on the second match signal.

The operation of the apparatus for matching the antenna of the mobile communication terminal in accordance with the second embodiment of the present invention will now be described with reference to FIG. 5.

First, when the slider of the mobile communication terminal is opened, the slide-up/down sensing unit 26 generates the first match signal and outputs it to the controller 25.

When the slider is closed, the slide-up/down sensing unit 26 generates the second match signal and outputs it to the controller 25.

The controller 25 generates the first control signal for connecting the first matching unit 22 and the antenna 20 based on the first match signal, and outputs it to the RF switch 21.

Also, the controller 25 generates the second control signal for connecting the second matching unit 24 and the antenna 20 based on the second match signal, and outputs it to the RF switch 21.

The RF switch 21 connects the antenna 20 and the first matching unit 22 based on the first control signal, or connects the antenna 20 and the second matching unit 24 based on the second control signal.

The first matching unit 22 is connected between the RF switch 21 and the RF signal generating unit 23, and matches impedance between the antenna 20 and the RF signal generating unit 23 when the slider of the mobile communication terminal is opened.

The second matching unit 24 is connected between the RF switch 21 and the RF signal generating unit 23, and matches impedance between the antenna 20 and the RF signal generating unit 23 when the slider is closed.

Figure 6:
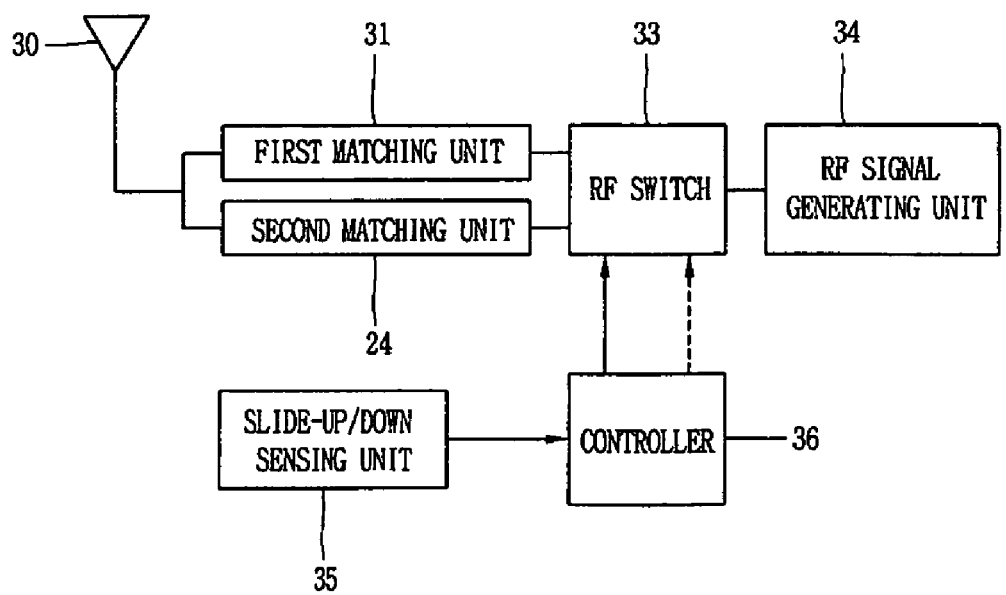
FIG. 6 is a schematic block diagram showing a slide type mobile communication terminal in accordance with a third embodiment of the present invention.

FIG. 6 is a schematic block diagram showing a slide type mobile communication terminal in accordance with a third embodiment of the present invention.

As shown in FIG. 6, an apparatus for matching an antenna of a mobile communication terminal in accordance with the third embodiment of the present invention includes: an antenna 30; an RF switch 33 electrically connected with an RF signal generating unit 34 and receiving a first or second control signal; a first matching unit 31 connected between the RF switch 33 and the antenna 30, and matching impedance between the antenna 30 and the RF signal generating unit 34 when a slider of the mobile communication terminal is opened; a second matching unit 32 connected between the RF switch 33 and the antenna 30, and matching impedance between the antenna 30 and the RF signal generating unit 34 when the slider is slide down (closed); a slide-up/down sensing unit 35 for generating a first match signal when the slider of the mobile communication terminal is slid up (opened), and generating a second match signal when the slider is closed; and a controller 26 for generating a first control signal for connecting the first matching unit 31 and the RF signal generating unit 34 based on the first match signal, or generating a second control signal for connecting the second matching unit 32 and the RF signal generating unit 34 based on the second match signal.

An operation of the apparatus for matching the antenna of the mobile communication terminal in accordance with the third embodiment of the present invention will now be described with reference to FIG. 6.

First, when the slider of the mobile communication terminal is opened, the slide-up/down sensing unit 35 generates the first match signal and outputs it to the controller 36.

Also, when the slider closed, the slide-up/down sensing unit 35 generates the second match signal and outputs it to the controller 36.

The controller 36 generates the first control signal for connecting the first matching unit 31 and the RF signal generating unit 34 based on the first match signal, and outputs it to the RF switch 33.

Also, the controller 36 generates the second control signal for connecting the second matching unit 32 and the RF signal generating unit 34 based on the second match signal, and outputs it to the RF switch 33.

The RF switch 33 connects the RF signal generating unit 34 and the first matching unit 31 based on the first control signal, and connects the RF signal generating unit 34 and the second matching unit 32 based on the second control signal.

The first matching unit 31 is electrically connected between the RF switch 33 and the antenna 30, and when the slider of the mobile communication terminal is opened, the first matching unit 31 matches impedance between the antenna 30 and the RF signal generating unit 34.

The second matching unit 32 is electrically connected between the RF switch 33 and the antenna 30, and when the slider is closed, the second matching unit 32 matches impedance between the antenna 30 and the RF signal generating unit 34.

Figure 7:
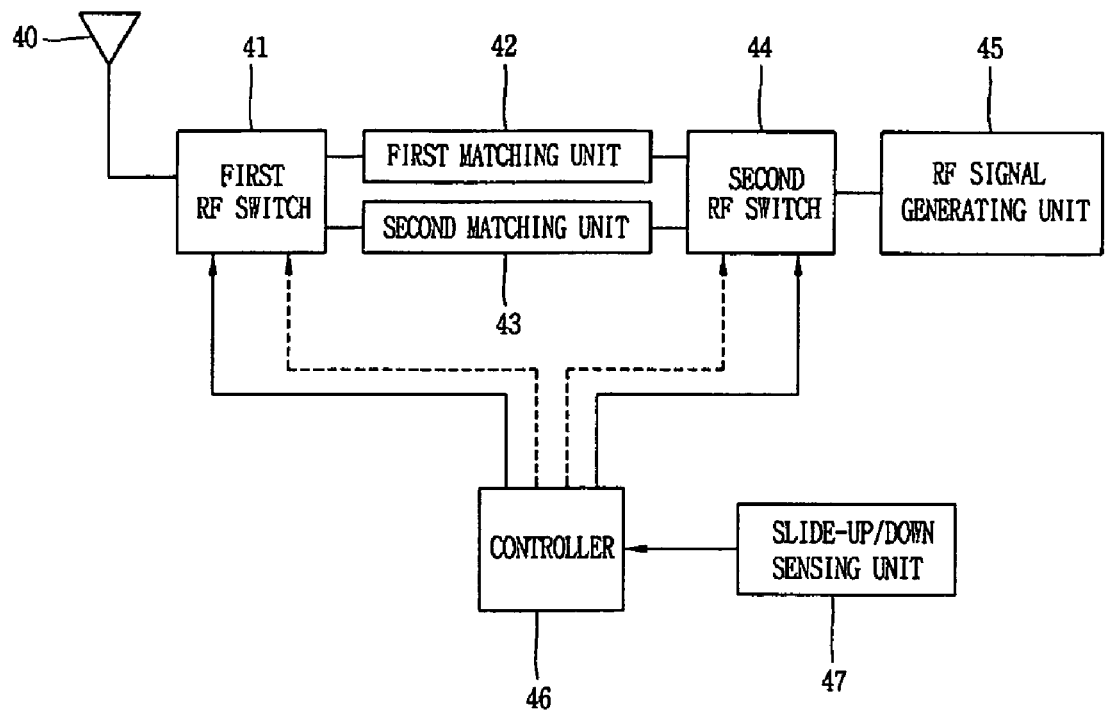
FIG. 7 is a schematic block diagram showing a slide type mobile communication terminal in accordance with a fourth embodiment of the present invention.

FIG. 7 is a schematic block diagram showing a slide type mobile communication terminal in accordance with a fourth embodiment of the present invention.

As shown in FIG. 7, an apparatus for matching an antenna of a mobile communication terminal in accordance with a fourth embodiment of the present invention includes: an antenna 40; a first RF switch 41 electrically connected with the antenna 40 and receiving a first or second control signal; a first matching unit 42 connected with the first RF switch 41 and matching impedance between the antenna 40 and an RF signal generating unit 45 when a slider of the mobile communication terminal is opened; a second matching unit 43 connected with the first RF switch 41 and matching impedance between the antenna 40 and the RF signal generating unit 45 when the slider is closed; a second RF switch 44 connected between the first matching unit 42 and the RF signal generating unit 45, connected between the second matching unit 43 and the RF signal generating unit 45, and receiving a third or fourth control signal; a slide-up/down sensing unit 47 for generating a first match signal when the slider of the mobile communication terminal is opened, and generating a second match signal when the slider is closed; and a controller 46 for generating a first control signal for connecting the antenna 40 and the first matching unit 42 or a third control signal for connecting the first matching unit 42 and the RF signal generating unit 45 based on the first match signal, or a second control signal for connecting the antenna 40 and the second matching unit 43 or a fourth control signal for connecting the second matching unit 43 and the RF signal generating unit 45 based on the second match signal.

The operation of the apparatus for matching the antenna of the mobile communication terminal in accordance with the fourth embodiment of the present invention will now be described with reference to FIG. 7.

First, when the slider of the mobile communication terminal is opened (slid up), the slide-up/down sensing unit 47 generates the first match signal and outputs it to the controller 46.

When the slider is closed (slid down), the slide-up/down sensing unit 47 generates the second match signal and outputs it to the controller 46.

The controller 46 generates the first control signal for connecting the antenna 40 and the first matching unit 42 and the third control signal for connecting the first matching unit 42 and the RF signal generating unit 45 based on the first match signal, and outputs the first control signal to the first RF switch 41 and the third control signal to the second RF switch 44.

Also, the controller generates the second control signal for connecting the antenna 40 and the second matching unit 43 and the fourth control signal for connecting the second matching unit 43 and the RF signal generating unit 45 based on the second match signal, and outputs the second control signal to the first RF switch 41 and the fourth control signal to the second RF switch 44.

The first RF switch 41 connects the antenna 40 and the first matching unit 42 based on the first control signal, or connects the antenna 40 and the second matching unit 43 based on the second control signal.

The second RF switch 44 connects the first matching unit 42 and the RF signal generating unit 45 based on the third control signal, or connects the second matching unit 43 and the RF signal generating unit 45 based on the fourth control signal.

The first matching unit 42 is connected between the first RF switch 41 and the second RF switch 44, and when the slider of the mobile communication terminal is opened, the first matching unit 42 matches impedance between the antenna 40 and the RF signal generating unit 45.

The second matching unit 43 is connected between the first RF switch 41 and the second RF switch 44, and when the slider of the mobile communication terminal is closed, the second matching unit 43 matches impedance between the antenna 40 and the RF signal generating unit 45.

Figure 8:
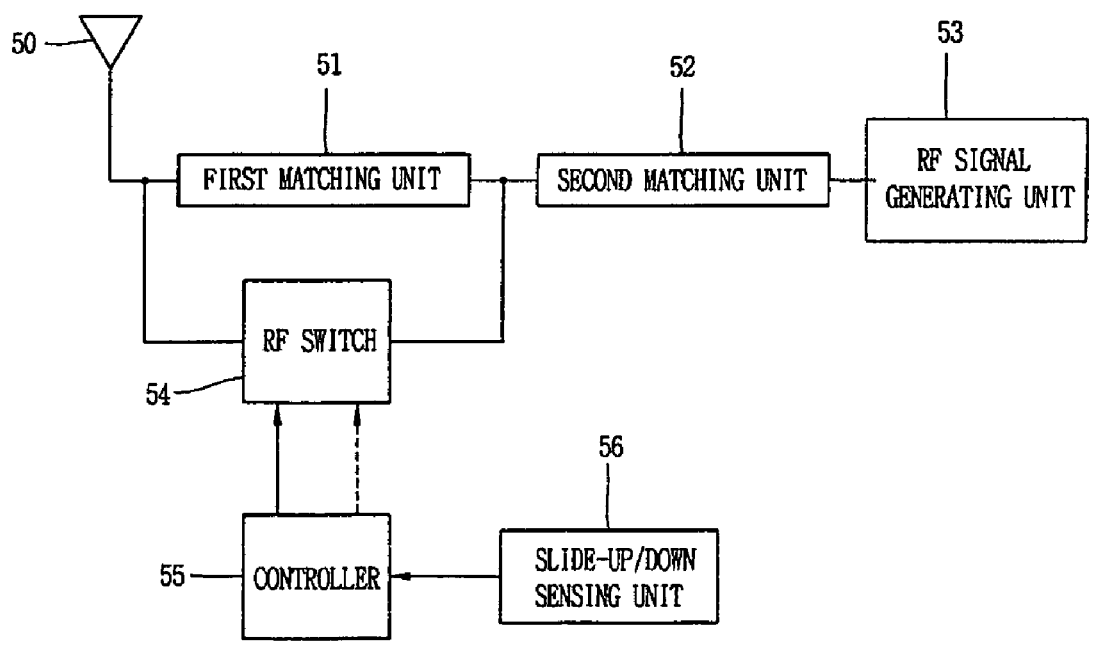
FIG. 8 is a schematic block diagram showing a slide type mobile communication terminal in accordance with a fifth embodiment of the present invention.

FIG. 8 is a schematic block diagram showing a slide type mobile communication terminal in accordance with a fifth embodiment of the present invention.

As shown in FIG. 8, an apparatus for matching an antenna of a mobile communication terminal in accordance with a fifth embodiment of the present invention includes: an antenna 50; a first matching unit 51 connected with the antenna 50 and matching impedance between the antenna 50 and an RF signal generating unit 53 when a slider of the mobile communication terminal is opened; a second matching unit 52 connected in series between the first matching unit 51 and the RF signal generating unit 53 and matching impedance between the antenna 50 and the RF signal generating unit 53 when the slide of the mobile communication terminal is opened; an RF switch 54 connected in parallel with the first matching unit 51 and receiving a first or second control signal; a slide-up/down sensing unit 56 for generating a first match signal when the slider of the mobile communication terminal is opened, and generating a second match signal when the slider is closed; and a controller 55 for generating a first control signal for outputting an RF signal outputted from the RF signal generating unit 53 to the antenna 50 through the first and second matching units 51 and 52 based on the first match signal, or generating a second control signal for outputting the RF signal generated from the RF signal generating unit 53 to the antenna 50 through the second matching unit 52 based on the second match signal.

The operation of the apparatus for matching the antenna of the mobile communication terminal in accordance with the fifth embodiment of the present invention will now be described with reference to FIG. 8.

First, when the slider of the mobile communication terminal is opened, the slide-up/down sensing unit 56 generates the first match signal and outputs it to the controller 55. Meanwhile, when the slider is closed, the slide-up/down sensing unit 56 generates the second match signal and outputs it to the controller 55.

The controller 55 generates the first control signal for outputting the RF signal outputted from the RF signal generating unit 53 to the antenna 50 through the first and second matching units 51 and 52 based on the first match signal, and outputs the first control signal to the RF switch 54. In addition, the controller 55 generates the second control signal for outputting the RF signal outputted from the RF signal generating unit 53 to the antenna 50 through the first matching unit 51 based on the second match signal, and outputs it to the RF switch 54.

The RF switch 54 applies the RF signal to the antenna 50 through the first and second matching units 51 and 52 based on the first control signal. For example, the RF switch 54 is opened according to the first control signal so that the RF signal can be applied to the antenna 50 through the first and second matching units 51 and 52.

Also, the RF switch 54 applies the RF signal to the antenna 50 through the second matching unit 52 based on the second control signal. For example, the RF switch 54 disconnects the ends of the first matching unit 51 based on the second control signal (i.e., breaks the circuit connection), so that the RF signal can be applied to the antenna 50 through the second matching unit 52.

When the slider of the mobile communication terminal is closed, the first matching unit 51 is not operated, and when the slider of the mobile communication terminal is opened, the first matching unit 51 matches impedance between the antenna 50 and the RF signal generating unit 53.

When the slider of the mobile communication terminal is opened or closed, the second matching unit 52 matches impedance between the antenna 50 and the RF signal generating unit 53. For example, the first matching unit 51 is additionally constructed to compensate a difference value between the impedance between the antenna 50 and the RF signal generating unit 53 when the slider of the mobile communication terminal is closed and the impedance between the antenna 50 and the RF signal generating unit 53 when the slider is opened. Namely, because the impedance between the antenna 50 and the RF signal generating unit 53 when the slider is opened is greater than the impedance between the antenna 50 and the RF signal generating unit 53 when the slider is closed, the impedance between the antenna 50 and the RF signal generating unit 53 is matched through the first and second matching units 51 and 52 when the slider of the mobile communication terminal is opened.

The slide-up/down sensing unit can be constructed variably. For example, when the mobile communication terminal is the slide type mobile communication terminal, the a magnet can be installed at an edge of the slider and a Hall effect switch can be installed at a portion where the magnet contacts when the slider is slid up and down, whereby whether the slider is opened or closed can be sensed. In other words, as the Hall effect switch generates a first voltage by a magnetic field generated when the slider is opened or generates a second voltage by a magnetic field generated when the slider is closed, opening or closing (sliding up or sliding down) of the slider can be sensed.

The Hall effect switch will now be described in detail with reference to FIG. 9.

Figure 9:
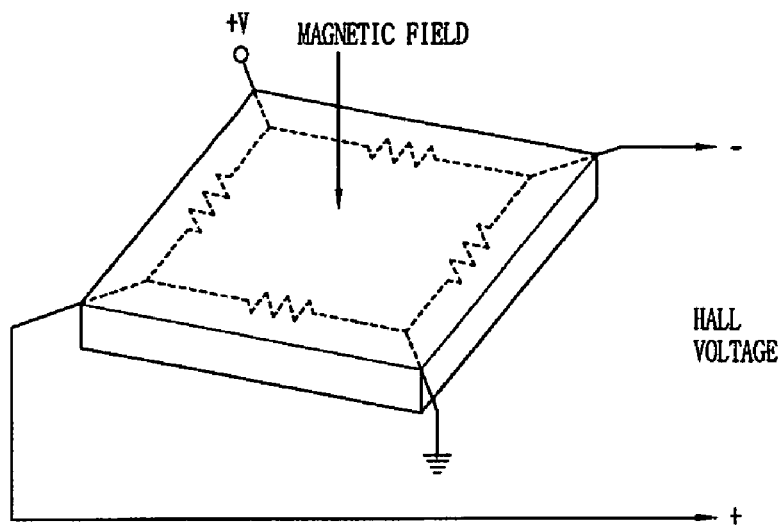
FIG. 9 shows a Hall effect switch applied to the embodiments of the present invention.

FIG. 9 shows a Hall effect switch applied to the embodiments of the present invention.

As shown in FIG. 9, the Hall effect switch is fabricated by using a phenomenon that a solid such as a metal or semiconductor is positioned in a magnetic field and a current is applied to the solid to form an electric field in the solid. For example, the Hall effect switch generates the first or second match signal by the magnetic field of the magnet installed at the folder or the slider of the mobile communication terminal. Accordingly, when the magnet installed at the folder or the slider approaches the Hall effect switch, the slide-up/down sensing unit generates the first match signal, and when the magnet installed at the folder or the slider becomes apart from the Hall effect switch, the slide-up/down sensing unit generates the second match signal.

Meanwhile, the RF switch can be constructed variably. The substantial construction of the RF switch will now be described with reference to FIG. 10.

Figure 10:
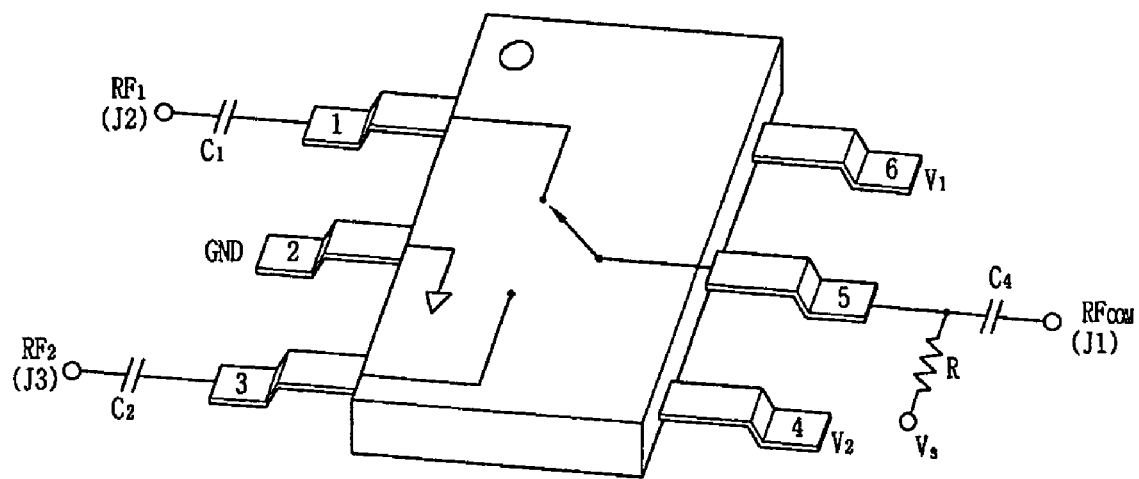
FIG. 10 shows the construction of an RF switch applied to the embodiments of the present invention.

FIG. 10 shows the construction of an RF switch applied to the embodiments of the present invention.

As shown in FIG. 10, the RF switch is a device for changing a path of an RF signal. For example, when a signal inputted to an $R_{COM}$ terminal has a low level, the RF switch connects the $RF_{COM}$ terminal to an $RF_1$ terminal, and when a signal inputted to the $RF_{COM}$ terminal has a high level, the RF switch connects the $RF_{COM}$ terminal to an $RF_2$ terminal.

As so far described, the apparatus for matching the antenna of the mobile communication terminal in accordance with the present invention has many advantages.

That is, for example, when the antenna and the display unit of the mobile communication terminal become adjacent or apart, the RF signal radiated from the antenna of the mobile communication terminal is uniformly maintained, so that the communication sensitivity (e.g., the efficiency, a bandwidth and a reflection pattern) and the speech quality of the mobile communication terminal can be enhanced.

In addition, when the antenna and the display unit of the mobile communication terminal become adjacent, the first match signal is generated, when the display unit becomes apart from the antenna, the second match signal is generated, and the impedance between the antenna and the RF signal generating unit is matched based on the first or second match signal, whereby degradation of the communication sensitivity and the communication quality of the mobile communication terminal due to a power loss generated by mismatching between the antenna and the LCD can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for matching an antenna of a mobile communication terminal, the apparatus comprising:
   an antenna;
   a switch connected to the antenna and configured to receive a first or second control signal;
   a first matching unit connected between the switch and an RF signal generating unit of the mobile communication terminal for matching a first impedance between the antenna and the RF signal generating unit if the antenna is adjacent to a display unit of the mobile communication terminal;
   a second matching unit connected between the switch and the RF signal generating unit for matching a second impedance between the antenna and the RF signal generating unit if the antenna is apart from the display unit;
   a sensing unit comprising a magnet and a Hall effect switch, wherein the Hall effect switch is configured to generate a first match signal if the antenna is adjacent to the display unit and generate a second match signal if the antenna is apart from the display unit; and
   a controller configured to generate the first control signal for connecting the first matching unit to the antenna in response to the first match signal and generate the second control signal for connecting the second matching unit to the antenna in response to the second match signal.

2. The apparatus of claim 1, wherein the magnet is situated at a folder or a slider of the mobile communication terminal.

3. The apparatus of claim 2, wherein the Hall effect switch is configured to generate the first match signal if a magnetic field of the magnet is detected and generate the second match signal if the magnetic field is not detected.

4. An apparatus for matching an antenna of a mobile communication terminal, the apparatus comprising:
   an antenna
   an RF switch electrically connected to an RF signal generating unit of the mobile communication terminal and configured to receive a first control signal or a second control signal;
   a first matching unit connected between the RF switch and the antenna for matching a first impedance between the antenna and the RF signal generating unit if the antenna is adjacent to a display unit of the mobile communication terminal;
   a second matching unit connected between the RF switch and the antenna for matching a second impedance between the antenna and the RF signal generator if the antenna is apart from the display unit;
   a sensing unit comprising a magnet and a Hall effect switch, wherein the Hall effect switch is configured to generate a first match signal if the antenna is adjacent to the display unit and generate a second match signal if the antenna is apart from the display unit; and
   a controller configured to generate the first control signal for connecting the first matching unit to the RF signal generating unit in response to the first match signal, and generate the second control signal for connecting the second matching unit to the RF signal generating unit in response to the second match signal.

5. The apparatus of claim 4, wherein the magnet is situated at a folder or a slider of the mobile communication terminal.

6. The apparatus of claim 5, wherein the Hall effect switch is configured to generate the first match signal if a magnetic field of the magnet is detected and generate the second match signal if the magnetic field is not detected.

7. An apparatus for matching an antenna of a mobile communication terminal, the apparatus comprising:
   an antenna;
   a first switch connected to the antenna and configured to receive a first control signal or a second control signal;
   a first matching unit connected to the first switch for matching a first impedance between the antenna and an RF signal generating unit of the mobile communication terminal if the antenna is adjacent to a display unit of the mobile communication terminal;
   a second matching unit connected to the first switch for matching a second impedance between the antenna and the RF signal generating unit if the antenna is apart from the display unit;
   a second switch connected between the first matching unit and the RF signal generating unit, and connected between the second matching unit and the RF signal generating unit, wherein the second switch is configured to receive a third control signal or a fourth control signal;
   a sensing unit comprising a magnet and a Hall effect switch, wherein the Hall effect switch is configured to generate a first match signal if the antenna is adjacent to the display unit and generate a second match signal if the antenna is apart from the display unit; and
   a controller configured to generate the first control signal for connecting the antenna to the first matching unit and generate the third control signal for connecting the first matching unit to the RF signal generating unit in response to the first match signal, and to generate the second control signal for connecting the antenna to the second matching unit and generate the fourth control signal for connecting the second matching unit to the RF signal generating unit in response to the second match signal.

8. The apparatus of claim 7, wherein the magnet is situated at a folder or a slider of the mobile communication terminal.

9. The apparatus of claim 8, wherein the Hall effect switch is configured to generate the first match signal if a magnetic field of the magnet is detected and generate the second match signal if the magnetic field is not detected.

10. An apparatus for matching an antenna of a mobile communication terminal, the apparatus comprising:
    an antenna;
    a first matching unit connected to the antenna for matching a first impedance between the antenna and an RF signal generating unit of the mobile communication terminal if the antenna is adjacent to a display unit of the mobile communication terminal;
    a second matching unit connected in series between the first matching unit and the RF signal generating unit for matching a second impedance between the antenna and the RF signal generating unit if the antenna is adjacent to the display unit;
    a switch connected in parallel with the first matching unit and configured to receive a first control signal or a second control signal;
    a sensing unit comprising a magnet and a Hall effect switch, wherein the Hall effect switch is configured to generate a first match signal if the antenna is adjacent to the display unit and generate a second match signal if the antenna is apart from the display unit; and
    a controller configured to generate the first control signal for providing an RF signal from the RF signal generating unit to the antenna via the first and second matching units in response to the first match signal, and to generate the second control signal for providing the RF signal from the RF signal generating unit to the antenna via the second matching unit in response to the second match signal.

11. The apparatus of claim 10, wherein the magnet is situated at a folder or a slider of the mobile communication terminal.

12. The apparatus of claim 11, wherein the Hall effect switch is configured to generate the first match signal if a magnetic field of the magnet is detected and generate the second match signal if the magnetic field is not detected.

* * * * *